(12) United States Patent
Yamada et al.

(10) Patent No.: US 7,857,350 B2
(45) Date of Patent: Dec. 28, 2010

(54) SEAT APPARATUS FOR VEHICLE

(75) Inventors: Yukifumi Yamada, Toyota (JP); Naoki Goto, Tokai (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 107 days.

(21) Appl. No.: 12/396,757

(22) Filed: Mar. 3, 2009

(65) Prior Publication Data

US 2009/0236882 A1    Sep. 24, 2009

(30) Foreign Application Priority Data

Mar. 21, 2008   (JP) ............................. 2008-073956

(51) Int. Cl.
*B60R 22/00* (2006.01)
*B60N 2/68* (2006.01)

(52) U.S. Cl. ..................... 280/801.1; 280/808; 297/473

(58) Field of Classification Search ............. 280/801.1, 280/808; 297/216.1, 470, 473
See application file for complete search history.

(56) References Cited

U.S. PATENT DOCUMENTS

| | | | | |
|---|---|---|---|---|
| 4,923,214 A | * | 5/1990 | Siegrist et al. | 280/806 |
| 5,775,780 A | * | 7/1998 | Murphy et al. | 297/473 |
| 7,063,389 B2 | * | 6/2006 | Kennedy, Sr. | 297/483 |
| 7,469,970 B2 | * | 12/2008 | Min | 297/470 |
| 2005/0269846 A1 | * | 12/2005 | Vits et al. | 297/216.1 |

FOREIGN PATENT DOCUMENTS

| DE | 103 11 869 A1 | 9/2004 |
|---|---|---|
| JP | 2002-337576 | 11/2002 |
| JP | 2002-347497 | 12/2002 |

OTHER PUBLICATIONS

U.S. Appl. No. 12/648,633, filed Dec. 29, 2009.

* cited by examiner

*Primary Examiner*—Paul N Dickson
*Assistant Examiner*—Joseph Rocca
(74) *Attorney, Agent, or Firm*—Oblon, Spivak, McClelland, Maier & Neustadt, L.L.P.

(57) ABSTRACT

A seat apparatus for a vehicle includes a first seat, a second seat, and a seatbelt mechanism provided at the second seat. A first frame member for supporting the second seat and a first seat slide mechanism for slidably moving the second seat are arranged to be vertically coplanar with the shoulder belt guide member and the belt anchor of the seatbelt mechanism. A first lock member is provided at a second frame member disposed adjacently to the first seat for supporting the second seat. A second lock member is provided at a supporting member for supporting the first seat. The first and second lock members allow a movement of the second frame member in a forward and backward direction of the vehicle and engage with each other for locking the second frame member relative to the vehicle floor when an excess load is received from the seatbelt mechanism.

12 Claims, 4 Drawing Sheets

SEAT APPARATUS FOR VEHICLE

CROSS REFERENCE TO RELATED APPLICATIONS

This application is based on and claims priority under 35 U.S.C. §119 to Japanese Patent Application 2008-073956, filed on Mar. 21, 2008, the entire content of which is incorporated herein by reference.

FIELD OF THE INVENTION

The present invention generally relates to a seat apparatus for a vehicle.

BACKGROUND

As an example of a seat apparatus for a vehicle including a double seat (a seat including two seating positions for accommodating two occupants) and a single seat (a seat including one seating position for accommodating one occupant) which adjoin each other in a width direction of the vehicle, a seat apparatus disclosed in DE103 11 869A1 (hereinafter, referred to as reference 1) has been known. According to the reference 1, the double seat is structured so that a three-point supporting seatbelt is assembled thereon for each seating position. Accordingly, a shoulder belt guide member (through anchor) for guiding a shoulder belt and a belt anchor of the three-point supporting seatbelt are provided at an approximately intermediate portion of the double seat in the width direction (lateral direction) of the vehicle. Further, seat slide mechanisms for adjusting a position in a front-rear direction of the vehicle is provided at lateral sides of the double seat, respectively. Still further, a seatback reclining mechanism (recliner) for adjusting a reclining angle of a seatback and an auxiliary seat slide mechanism which is movable in the front-rear direction of the vehicle are provided at the laterally intermediate portion of the double seat, at which the belt anchor and the shoulder belt guide member are also provided. The auxiliary seat slide mechanism functions as a reinforcement member and receives a separating load and a bending moment, i.e., a load generated by the shoulder belt anchor provided at the laterally intermediate portion of the double seat and a load generated by the lap belt anchor provided at the laterally intermediate portion of the double seat, when a collision of the vehicle occurs, for example. Thus, the seat is suppressed from separating from a vehicle floor.

A double seat including such structure is also disclosed in JP 2002-337576A and in JP2002-347497A, as an example.

According to the reference 1, the double seat includes three seat slide mechanisms (the seat slide mechanisms disposed at the lateral sides of the double seat and the auxiliary seat slide mechanism), which extend in the front-rear direction of the vehicle while having a distance from each other in the lateral direction. Accordingly, the weight of the seat apparatus is increased, and also the structure of the seat apparatus becomes complicated. Further, because the three seat slide mechanisms occupy a floor space defined at a back side of the double seat, i.e., a foot space of an occupant seated on a backside seat disposed at a backside of the double seat, a seating attitude of the occupant seated on the backside seat may be restrained.

A need thus exists for a seat apparatus for a vehicle, which is not susceptible to the drawback mentioned above.

SUMMARY OF THE INVENTION

According to an aspect of the present invention, a seat apparatus for a vehicle includes a first seat, a second seat and a seatbelt mechanism. The first seat is adapted to be mounted on a vehicle floor and includes a first seating position. The second seat is adapted to be mounted on the vehicle floor via a first seat slide mechanism and a second seat slide mechanism extending in a forward and backward direction of the vehicle so as to adjoin the first seat in a width direction of the vehicle. The second seat includes a second seating position and a third seating position located between the first seating position and the second seating position. The seatbelt mechanism is provided at the third seating position of the second seat and includes a shoulder belt guide member for guiding a shoulder belt, a belt anchor to which a first end portion of a lap belt is fixedly connected, and a bell attachment portion which is provided at a first side portion of the second seat being adjacent to the first seat and to which a first end portion of the shoulder belt and a second end portion of the lap belt are configured to be fixedly connected. A first frame member for supporting the second seat and the first seat slide mechanism are arranged to be vertically coplanar with the shoulder belt guide member and the belt anchor. The second seat slide mechanism is disposed at a second side portion of the second seat being opposite from the first seat. A second frame member for supporting the second seat is disposed at the first side portion of the second seat. A first lock member is provided at the second frame member of the second seat. A second lock member is provided at a supporting member for supporting the first seat. The first and second lock members allow a movement of the second frame member in the forward and backward direction of the vehicle and engage with each other for locking the second frame member relative to the vehicle floor when an excess load is received from the seatbelt mechanism.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
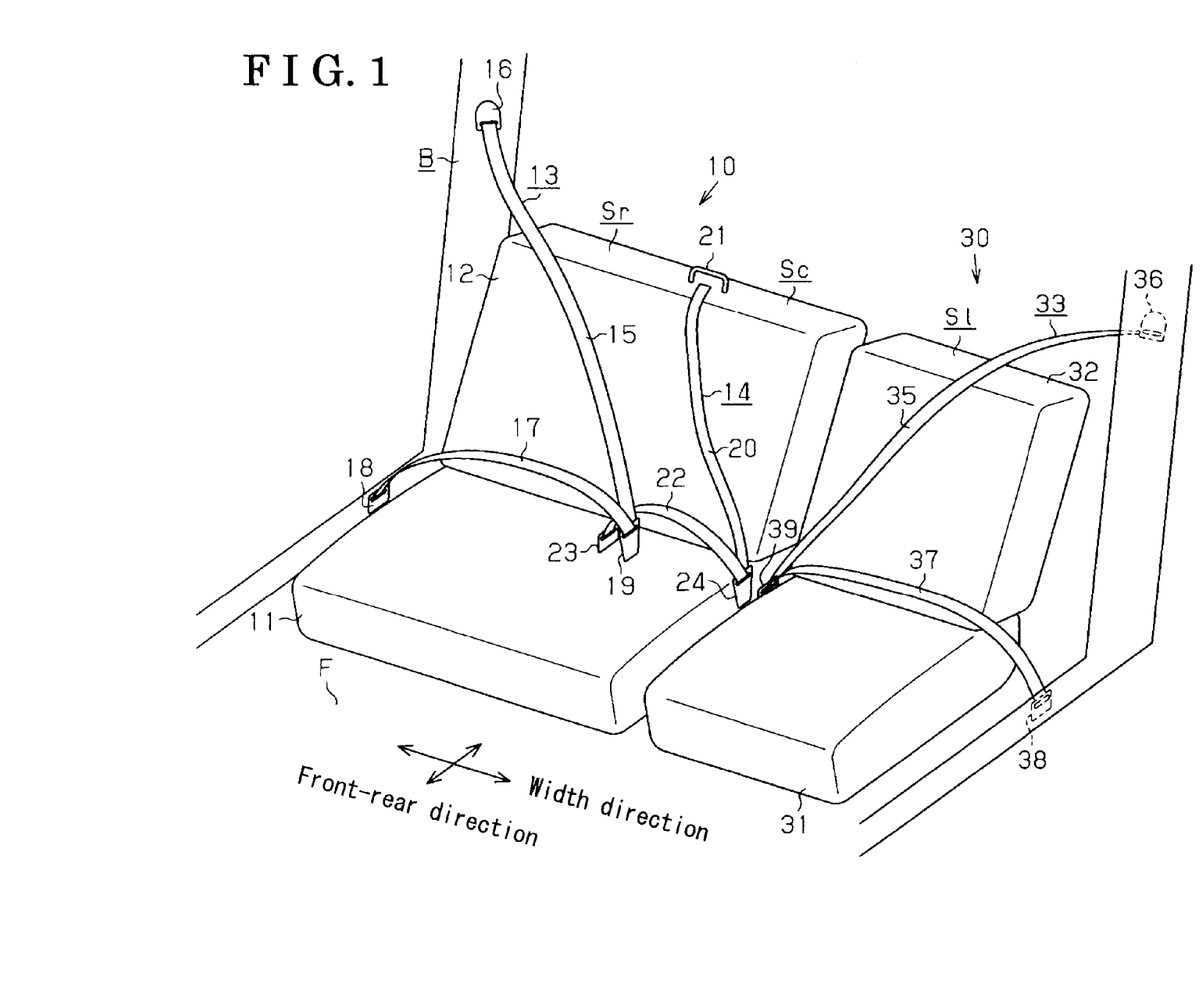
FIG. 1 is a perspective view illustrating a seat apparatus for a vehicle, according to an embodiment.

A first embodiment of the present invention will be described hereinbelow with reference to the attached drawings. As illustrated in FIG. 1, a double seat (a seat for accommodating two occupants) and a single seat 30 (a seat for accommodating one occupant) are mounted on a vehicle floor F so as to adjoin each other in a width direction (a lateral direction) of the vehicle. The double seat 10 (serving as a second seat) and the single seat 30 (serving as a first seat) are adapted to be positioned on a second row in a vehicle having a three-row seating configuration, as an example. Hereinafter, directions, such as "front and rear (longitudinal)", "right and left (lateral/width direction), "upper and lower (vertical)", and the like, correspond to the orientation of the seats (10 and 30). The double seat 10 is disposed on a right side space in the vehicle compartment, for example. The double seat 10 includes a seat cushion 11, which structures a seating surface, and a seatback 12, which is pivotably supported at a rear end portion of the seat cushion 11. The single seat 30 is disposed at a left side space in the vehicle compartment, for example. In the same manner as the double seat 10, the single seat 30 includes a seat cushion 31 and a seatback 32.

Three-point supporting seatbelts 13 and 14 are assembled onto the double seat 10 at seating positions thereof, respectively, and a three-point supporting seatbelt 33 is assembled onto the single seat 30 at a seating position thereof. More specifically, the three-point supporting seatbelt 13 is provided at a right side seating position of the double seat 10, i.e., a seating position being opposite from the single seat 30 (serving as a second seating position). Hereinafter, the right side seating position of the double seat 10 is referred to as a right seating position Sr. The three-point supporting seatbelt 13 includes a shoulder belt guide member 16, a lap belt anchor 18 and a belt buckle plate 19. The shoulder belt guide member 16 is provided at a right upper side portion of a vehicle body B. A shoulder belt 15 is configured to be unwound from the shoulder belt guide member 16 by being guided thereby. The lap belt anchor 18 is provided at a right lower side portion of the vehicle body B. A first end portion of a lap belt 17 is fixed to the lap belt anchor 18. The belt buckle plate 19 is provided at a laterally intermediate portion of the seat cushion 11. An end portion of the shoulder belt 15 unwound from the shoulder belt guide member 16 and a second end portion of the lap belt 17 are configured to be fixed to the belt buckle plate 19. The end portion of the shoulder belt 15 and the second end portion of the lap belt 17 are separated by a first tang member. When the first tang member is inserted into a buckle of the belt buckle plate 19, the end portion of the shoulder belt 15 and the second end portion of the lap belt 17 are fixed to the belt buckle plate 19. The shoulder belt 15 is guided by the shoulder belt guide member 16 and is wound to a winding device, such as an ELR (Emergency Locking Retraction), which is incorporated in the vehicle body B, for example.

The three-point supporting seatbelt 14 (serving as a seatbelt mechanism) is provided at a left side seating position of the double seat 10, i.e., a seating position being adjacent to the single seat 30 (serving as a third seating position located between a first seating position the second seating position). Hereinafter, the left side seating position of the double seat 10 is referred to as an intermediate seating position Sc. The three-point supporting seatbelt 14 includes a shoulder belt guide member 21, a belt buckle plate (serving as a belt anchor) 23 and a belt buckle plate (serving as a belt attachment portion) 24. The shoulder belt guide member 21 is provided at a laterally intermediate portion of an upper portion of the seatback 12. A shoulder belt 20 is configured to be unwound from the shoulder belt guide member 21 by being guided thereby. The belt buckle plate 23 is provided at the laterally intermediate portion of the seat cushion 11. A first end portion of a lap belt 22 is fixedly connected to the belt buckle plate 23. The belt buckle plate 24 is provided at the left side of the seat cushion 11, i.e., at a side portion of the double seat 10 being adjacent to the single seat 30 (serving as a first side portion of the second seat). An end portion of the shoulder belt 20 and a second end portion of the lap belt 22 are configured to be fixed to the belt buckle plate 24. A second tang member is provided at the first end portion of the lap belt 22 and is configured to be inserted into a buckle of the belt buckle plate 23, thereby fixedly connecting the first end of the lap belt 22 to the belt buckle plate 23. Further, the end portion of the shoulder belt 20 and a second end portion of the lap belt 22 are separated by a third tang member. When the third tang member is inserted into a buckle of the belt buckle plate 24, the end portion of the shoulder belt 20 and the second end portion of the lap belt 22 are fixedly connected to the belt buckle plate 24. The shoulder belt 20 is guided by the shoulder belt guide member 21 and is wound to a winding device, such as the ELR.

The three-point supporting seatbelt 33 provided at the seating position of the single seat (serving as the first seating position of the first seat) 39 includes a shoulder belt guide member 36, a lap belt anchor 38 and a belt buckle plate 39. The shoulder belt guide member 36 is provided at a left upper side portion of the vehicle body B. A shoulder belt 35 is configured to be unwound from the shoulder belt guide 36 by being guided thereby. The lap belt anchor 38 is provided at a left lower side portion of the vehicle body B. A first end portion of a lap belt 37 is fixed to the lap belt anchor 38. The belt buckle plate 39 is provided at a right side portion of the seat cushion 31, i.e., at a side portion adjacent to the double seat 10 (serving as a first side portion of the first seat). An end portion of the shoulder belt 35 and a second end portion of the lap belt 37 are configured to be fixed to the belt buckle plate 39. The end portion of the shoulder belt 35 and the second end portion of the lap belt 37 are separated by a fourth tang member. When the fourth tang member is inserted into a buckle of the belt buckle plate 39, the end portion of the shoulder belt 35 and the second end portion of the lap belt 37 are fixedly connected to the belt buckle plate 37. The shoulder belt 35 is guided by the shoulder belt guide member 36 and is wound to a winding device, such as the ELR, which is incorporated in the vehicle body B, for example.

Figure 2:
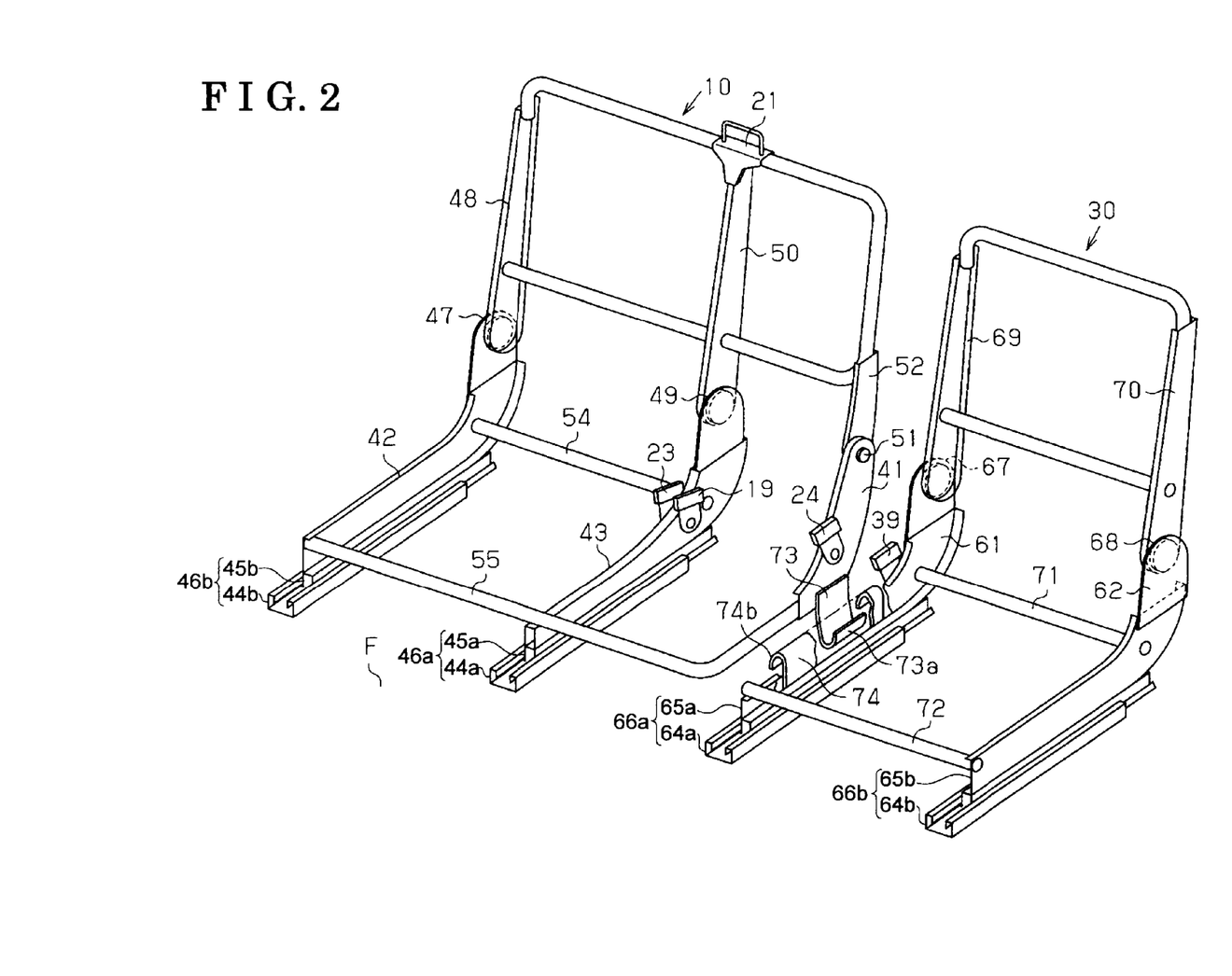
FIG. 2 is a perspective view illustrating a framework of the seat apparatus for the vehicle, according to the first embodiment.
Figure 3:
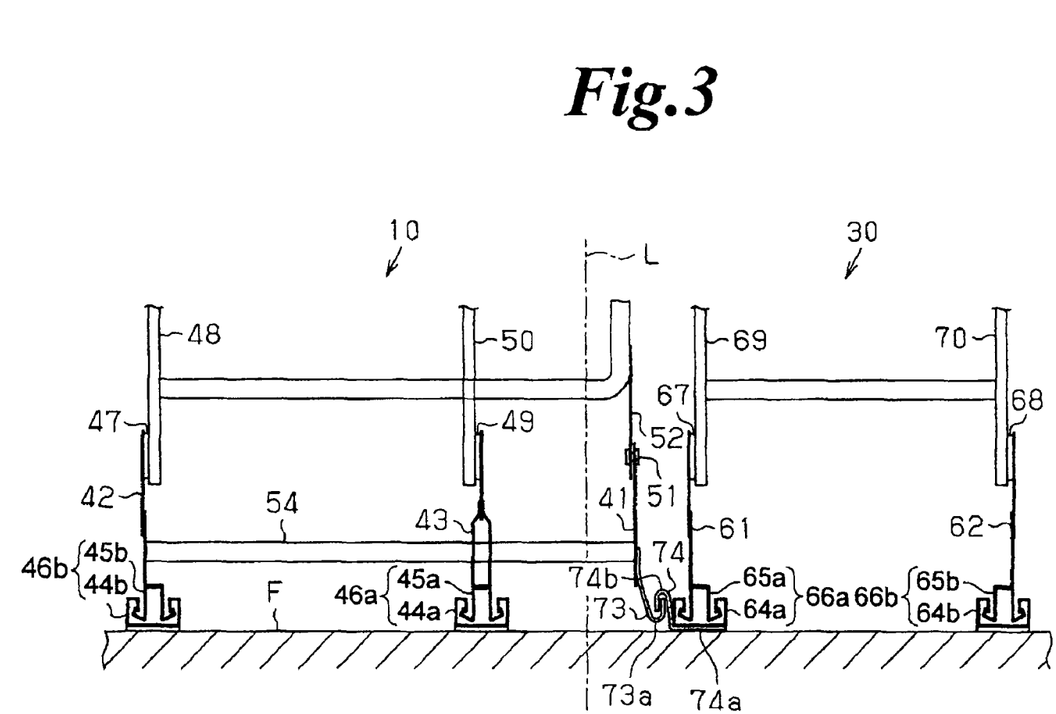
FIG. 3 is a front view illustrating the framework of the seat apparatus for the vehicle, according to the first embodiment.

As illustrated in FIGS. 2 and 3, the double seat 10 includes a side bracket 41, a side frame 42 and a center frame 43. Each of the side bracket 41 and the side frame 42 is made from a plate member. The side bracket 41 is provided at the side portion of the double seat 10 at a side being adjacent to the single seat 30 (serving as the first side portion of the second seat), i.e., according to the embodiment, the left side portion, for example. The side frame 42 is provided at a side portion of the double seat 10 at a side being opposite from the single seat 30 (serving as a second side portion of the second seat), i.e., according to the embodiment, the right side portion, for example. The center frame 43 is made from a plate member. The center frame 43 is provided at the laterally intermediate portion of the double seat 10. The center frame 43 serves as a first frame member, while the side bracket 41 serves as a second frame member. Further, a first lower rail 44a and a second lower rail 44b are mounted on the vehicle floor F so as to face the center frame 43 and the side frame 42, respectively. Each of the first and second lower rails 44a and 44b includes a U-shaped cross-section, which opens towards an upper side thereof. Still further, a first upper rail 45a and a second upper rail 45b are assembled onto the first and second lower rails 44a and 44b, respectively, so as to be slidable in the forward and backward direction of the vehicle relative to the corresponding lower rails 44a and 44b. Each of the first and second upper rails 45a and 45b includes a U-shaped cross-section, which opens towards a lower side thereof. The first lower rail 44a and the first upper rail 45a structure a first seat slide mechanism 46a, while the second lower rail 44b and the second upper rail 45b structure a second seat slide mechanism 46b, for forwardly and backwardly moving the double seat 10. Accordingly, the side frame 42 and the center frame 43 (i.e., the double seat 10) are supported on the vehicle floor F via the first and second seat slide mechanisms 46a and 46b extending in the longitudinal direction of the vehicle.

Further, a seatback side frame 48, which is made from a plate member, is pivotably connected to a rear end portion of the side frame 42 via a reclining mechanism 47 for adjusting a reclining angle of a seatback of the double seat 10. A seatback center frame 50 made from a plate member is pivotably connected to a rear end portion of the center frame 43 via a reclining apparatus 49 serving as the seatback reclining angle adjusting mechanism. Still further, a seatback side bracket 52 made from a plate member is pivotably connected to a rear end portion of the side bracket 41. The side bracket 41, the side frame 42 and the center frame 43 structure a framework of the seat cushion 11, and the seatback side frame 48, the seatback center frame 50 and the seatback side bracket 52 structure a framework of the seatback 12. The belt buckle plates 19 and 23 are disposed at the rear end portion of the center frame 43, and the shoulder belt guide member 21 is disposed at an upper end portion of the seatback center frame 50. In other words, the center frame 43, the first seat slide mechanism 46a supporting the center frame 43, and the reclining apparatus 49 are disposed on a vertical plane on which the shoulder belt guide member 21 and the belt buckle plate 23 are disposed (i.e., those components are arranged to be coplanar in the vertical direction). Further, the belt buckle plate 24 is disposed at the rear end portion of the side bracket 41.

The rear end portion of the side bracket 41 and the rear end portion of the side frame 42 are connected with each other via a rear cross member 54, which is a cylindrical member extending in the lateral direction of the seat between the side frame 42 and the center frame 43 and is arranged to penetrate through the center frame 43. Further, a front end portion of the side frame 42 and a front end portion of the center frame 43 are connected with each other via a front cross member 55, which is a cylindrical member extending in the lateral direction of the seat. A left end portion of the front cross member 55 (i.e., an end portion being adjacent to the single seat 30) is bent in the backward direction and is connected to a front end portion of the side bracket 41.

The single seat 30 includes a pair of side frames 61 and 62, which are made from a plate member. The side frame 61 is provided at a side portion being adjacent to the double seat 10 (serving as the first side portion of the first seat), i.e., according to the embodiment, at the right side portion of the single seat 30, for example. The side frame 62 is provided at a side portion being opposite from the double seat 10 (serving as a second side portion of the first seat), i.e., according to the embodiment, at the left portion of the single seat 30, for example. A third lower rail 64a and a fourth lower rail 64b are mounted on the vehicle floor F so as to face the side frames 61 and 62, respectively. Each of the third and fourth lower rails 64a and 64b includes a U-shaped cross section which opens towards an upper side thereof. Further, a third upper rail 65a and a fourth upper rail 65b are provided at lower end portions of the side frames 61 and 62, respectively. The third and fourth upper rails 65a and 65b are assembled onto the third and fourth lower rails 64a and 64b, respectively, so as to be slidable in the forward and backward direction of the vehicle relative to the corresponding lower rails 64a and 64b. The third lower rail 64a and the third upper rail 65a structure a third seat slide mechanism 66a (serving as a supporting member for supporting the first seat), while the fourth lower rail 64b and the fourth upper rail 65b structure a fourth seat slide mechanism 66b, for forwardly and backwardly moving the single seat 30. Accordingly, the side frames 61 and 62 (i.e., the single seat 30) are supported on the vehicle floor F via the third and fourth seat slide mechanisms 66a and 66b.

Further, a seatback side frame 69 made from a plate member is pivotably connected to the side frame 61 via a reclining apparatus 67, and a seatback side frame 70 made from a plate member is pivotably connected to the side frame 62 via a reclining apparatus 68. The side frames 61 and 62 structure a framework of the seat cushion 31, and the seatback side frame 69 and 70 structure a framework of the seatback 32. The belt buckle plate 39 is disposed at a rear end portion of the side frame 61.

The rear end portion of the side frame 61 and a rear end portion of the side frame 62 are connected with each other via a rear cross member 71, which is a cylindrical member extending in the lateral direction of the seat. A front end portion of the side frame 61 and a front end portion of the side frame 62 are connected with each other via a front cross member 72, which is a cylindrical member extending in the lateral direction of the seat.

An upper hook 73 made from a plate member is fixedly connected to the side bracket 41 of the double seat 10 so as to face the single seat 30. The upper hook 73 serves as a first lock member and also as a first hook. The upper hook 73 extends in the forward and backward direction of the vehicle and includes a hook portion 73a. The hook portion 73a protrudes from the side bracket 41 in the lower direction and includes a U-shaped cross section, which opens towards an upper side thereof.

Figure 4:
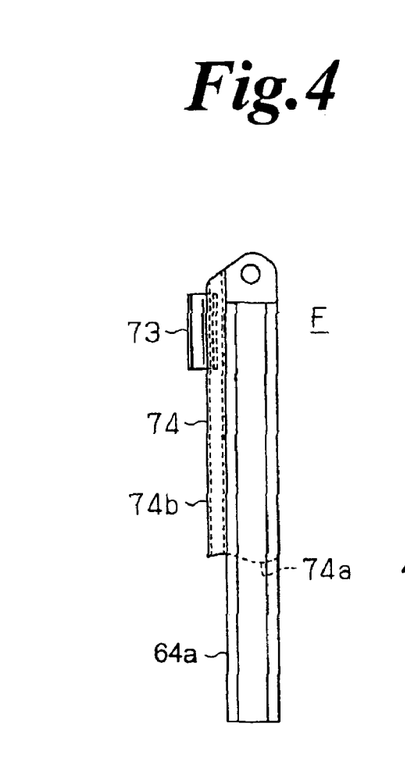
FIG. 4 is a planar view illustrating a part of the framework of the seat apparatus for the vehicle, according to the first embodiment.

On the other hand, a lower hook 74 made from a plate member is fixedly provided at the third lower rail 64a (the third seat slide mechanism 66a), which is provided adjacently to the side bracket 41 of the double seat 10, i.e., according to the embodiment, the right lower rail, so as to face the double seat 10. The third lower rail 64a (the third seat slide mechanism 66a) serves as a supporting member for supporting the side frame 61 provided adjacently to the side bracket 41 of the double seat 10. The lower hook 74 serves as a second lock member and also as a second hook. As illustrated in FIGS. 3 and 4, the lower hook 74 includes an attachment portion 74a, which includes a plane plate disposed between the vehicle floor F and the third lower rail 64a, and a hook portion 74b, which protrudes from the attachment portion 74a in the upper direction and includes a U-shaped cross section opening towards a lower side thereof. The upper hook 73 and the lower hook 74 structure the lock mechanism.

So configured, a clearance is generated between the upper hook 73 and the lower hook 74 (the hook portions 73a and 74b). Therefore, when the side bracket 41 (the double seat 10) moves in the forward and backward direction, the upper hook 73 and the lower hook 74 are prevented from interfering with each other. In other words, the upper hook 73 and the lower hook 74 allow a relative movement (the movement in the forward and backward direction) between the side bracket 41 of the double seat 10 and the side frame 61 of the single seat 30 without interacting the side bracket 41 and the side frame 61. Further, in a condition where the double seat 10 is forced forwardly due to an excess load received through the seatbelts 13 and 14 (hereinafter, referred to as seatbelt load), when a collision of the vehicle occurs, for example, the upper hook 73 and the lower hook 74 (the hook portions 73a and 74b) are engaged with each other, thereby locking the side bracket 41 of the double seat 10 to the third lower rail 64a (vehicle floor F).

Further, as illustrated in FIG. 3, the first seat slide mechanism 46a, which is provided adjacently to the single seat 30 for supporting the center frame 43, and the third seat slide mechanism 66a, which is provided adjacently to the double seat 10 for supporting the side frame 61, are symmetrically arranged relative to a center line defined at an approximately laterally intermediate portion of the vehicle floor F (which is indicated with a symmetric axis L in FIG. 3). In other words, the center frame 43 of the double seat 10 and the side frame 61 of the single seat 30 are symmetrically arranged relative to the center line L. Further, in the condition where the collision of the vehicle occurs when each of the seating positions Sr, Sc and Sl is occupied, for example, the seatbelt load, which is applied to the vehicle floor F at the position corresponding to center frame 43 (i.e., the load applied to the first seat slide mechanism 46a) is inputted from an end of the shoulder belt 20 of the three-point supporting seatbelt 14 provided at the intermediate seating position Sc, an end of the lap belt 22 of the three-point seatbelt 14, an end of the shoulder belt 15 of the three-point supporting seatbelt 13 provided at the right seating position Sr and an end of the lap belt 17 of the three-point supporting seatbelt 13. Further, in the same condition, the seatbelt load, which is applied to the vehicle floor F at the position corresponding to the side frame 61 (i.e., the load applied to the third seat slide mechanism 66a) is inputted from an end of the shoulder belt 20 of the three-point supporting seatbelt 14, an end of the lap belt 22 of the three-point supporting seatbelt 14, an end of the shoulder belt 35 of the three-point supporting seatbelt 33 and an end of the lap belt 37 of the three-point supporting seatbelt 33. Thus, the number of input portions of the seatbelt load applied to the first seat slide mechanism 46a (to the vehicle floor F at the position corresponding to the center frame 43) is determined to be equal to the number of input portions of the seatbelt load applied to the third seat slide mechanism 66a (to the vehicle floor F at the position corresponding to the side frame 61). Accordingly, the magnitude of the seatbelt load transmitted to the vehicle floor F at the position corresponding to the center frame 43 and the magnitude of the seatbelt load transmitted to the vehicle floor F at the position corresponding to the side frame 61 are arranged to be approximately the same.

According to the embodiment described above, effects described below will be achieved. First, according to the embodiment, although the double seat 10 includes the lock mechanism (the upper hook 73 and the lower hook 74) between the side bracket 41 and the vehicle floor F, the lock mechanism includes a simple structure which does not interact with the side bracket 41. Further, a part of a space for disposing the third seat slide mechanism 66a of the single seat 30 is employed for disposing the lock mechanism. Therefore, a space required for disposing the lock mechanism may be reduced. Further, the double seat 10 includes two seat slide mechanisms (first and second seat slide mechanisms 46a and 46b). Therefore, an increase of the weight of the seat apparatus is suppressed, and a structure of the seat apparatus is simplified. Still further, the seatbelt load generated when the collision of the vehicle occurs is received by the upper hook 73 and the lower hook 74 in addition to the first and second seat slide mechanisms 46a and 46b. Accordingly, a satisfactory strength (resistibility) of the seat apparatus is assured. Thus, the double seat 10 is restrained from being forced to be separated from the vehicle floor F, and the deformation of the double seat 10 is restrained.

Second, according to the embodiment, the lower hook 74 is provided at the third lower rail 64a, which structures the third seat slide mechanism 66a being adjacent to the side bracket 41. Thus, a space for the third seat slide mechanism 66a is effectively used as a space for disposing the lower hook 74.

Third, according to the embodiment, a position of the upper hook 73 and the lower hook 74, each of which extends in the forward and backward direction of the vehicle, may be determined in accordance with a longitudinal range of the side bracket 41 or a longitudinal range of the third seat slide mechanism 66a provided adjacently to the side bracket 41 of the double seat 10. Accordingly, the upper hook 73 and the lower hook 74 are restrained from exposing to an external portion of the seat apparatus, thereby improving an external appearance of the seat apparatus. Further, each of the upper hook 73 and the lower hook 74 is easily formed by bending the plate member, for example.

Fourth, according to the embodiment, the center frame 43 of the double seat 10 and the side frame 61 of the single seat 30 are arranged symmetrically relative to the center line L. Further, the number of input portions of the seatbelt load applied to the first seat slide mechanism 46a (to the vehicle floor F at the position corresponding to the center frame 43) is determined to be equal to the number of input portions of the seatbelt load applied to the third seat slide mechanism 66a (to the vehicle floor F at the position corresponding to the side frame 61). Accordingly, the magnitude of the seatbelt load transmitted to the vehicle floor F at the position corresponding to the center frame 43 and the magnitude of the seatbelt load transmitted to the vehicle floor F at the position corresponding to the side frame 61 are arranged to be approximately the same. Therefore, the vehicle floor F is deformed equally in the lateral direction when the collision of the vehicle occurs, for example.

Fifth, the double seat 10 includes two seat slide mechanisms (first and second seat slide mechanisms 46a and 46b). Therefore, a space between the side bracket 41 and the center frame 43 is substantially opened. Accordingly, a sufficient foot space of an occupant seated on a backside seat disposed at a backside of the double seat 10 is obtained, and a restriction of a seating attitude of the occupant seated on the backside seat is reduced.

A second embodiment of the present invention will be described hereinbelow with reference to the attached drawings. According to the second embodiment, a lock mechanism, which includes a different structure from the structure of the lock mechanism (the upper hook 73 and the lower hook 74) according to the first embodiment, is employed. The description of portions having the same structure will be omitted herein.

Figure 5:
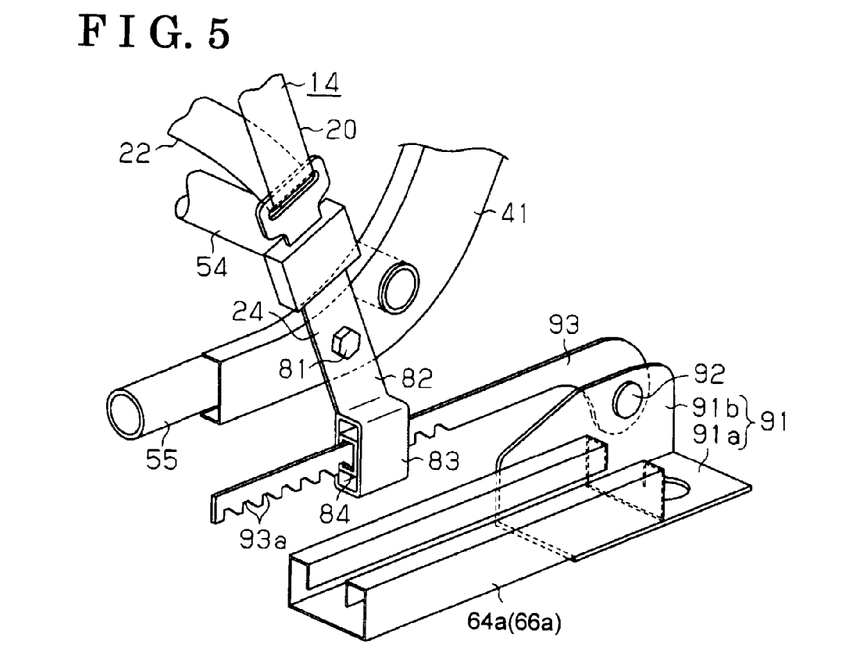
FIG. 5 is a perspective view illustrating a part of the framework of the seat apparatus for the vehicle, according to the second embodiment.
Figure 6:
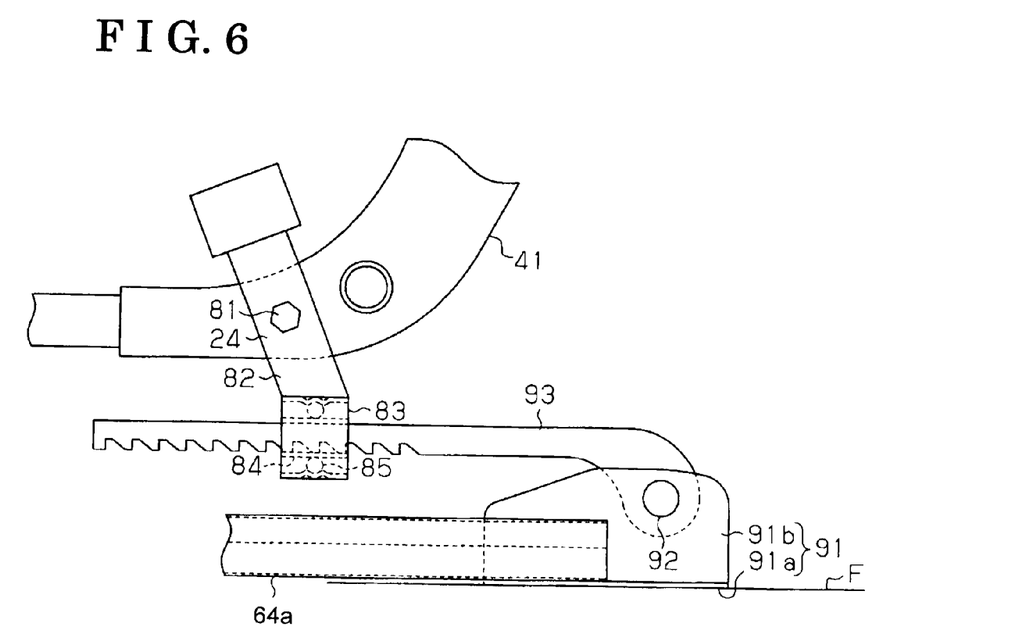
FIG. 6 is a side view illustrating a part of the framework of the seat apparatus for the vehicle, according to the second embodiment.

As illustrated in FIGS. 5 and 6, the belt buckle plate 24 provided at the side bracket 41 of the double seat 10 includes a supporting point 81 (serving as a pivot center) at which the belt buckle plate 24 is supported to the side bracket 41, and an extending portion 82, which extends from the supporting point 81 in the lower direction. Further, the belt buckle plate 24 includes a guide member 83, which is formed at an end portion of the extending portion. The guide member 83 (serving as a first lock member) is formed in a quadrate hollow member extending in the forward and backward direction of the vehicle. Further, as illustrated in FIGS. 5 and 6, a quadrate hollow member 84 (serving as a hollow portion) is housed in the guide member 83 at an intermediate portion thereof in the height direction. The quadrate hollow member 84 extends in the forward and backward direction of the vehicle and is made of a resin material, for example. Further, a ball member 85 (serving as a locking portion) is retained in the guide member 83 at a lower side of the hollow member 84, i.e., between a lower side surface of the quadrate hollow member 84 and an inner surface of a base wall of the guide member 83.

On the other hand, an L-shaped bracket 91 is fixedly provided at a rear end portion of the third lower rail 64a of the third seat slide mechanism 66a, which supports the side frame 61 being adjacent to the side bracket 41 of the double seat 10. The bracket 91 includes a first attachment portion 91a, which is a plane plate member provided between the vehicle floor F and the third lower rail 64a, and a second attachment portion 91b, which extends upwardly from the first attachment portion 91a. The bracket 91 is fixed to the vehicle floor F at the rear end portion of the third lower rail 64a by a connecting member, for example. Accordingly, the third lower rail 64a and the bracket 91 are fixedly integrally connected to each other. Then, a supporting lever 93 (serving as a lever member) is pivotably connected to the second attachment portion 91b of the bracket 91 about a supporting pivot shaft 92, The supporting lever 93 extends in the front direction from a position at which the supporting pivot shaft 92 is connected. Further, the supporting lever 93 is inserted through the quadrate hollow member 84 of the guide member 83. Plural locking teeth (serving as a plurality of locking protrusions) 93a are longitudinally equidistantly formed at a lower side portion of the supporting lever 93 exhibiting a saw blade shape. The ball member 85 is disposed to face one of the locking teeth 93a in accordance with a position of the double seat 10 in the forward and backward direction of the vehicle. When the collision of the vehicle occurs, for example, the hollow member 84 is deformed (crushed) between one of the locking teeth 93a and the ball member 85 and the one of the locking teeth 93a and the ball member 85 are engaged with each other (more specifically, the ball member 85 is lodged between two of the locking teeth 93a), thereby locking the side bracket 41 (the double seat 10) relative to the vehicle floor F. The supporting lever 93 and the guide member 83, which structures the locking mechanism, includes a saber mechanism.

Due to the above described structure, when a normal seatbelt load is applied to the double seat 10, for example, the ball member 85 is prevented from being engaged with one of the locking teeth 93a by being interrupted by the hollow member 84. In other words, when the side bracket 41 (the double seat 10) moves in the forward and backward direction of the vehicle, although the guide member 83 (the hollow member 84) slidably moves on the supporting lever 93, the guide member 83 and the supporting lever 93 allows the movement of the side bracket 41 in the forward and backward direction of the vehicle. Then, when the collision of the vehicle occurs, the hollow member 84 is deformed between one of the locking teeth 93a and the ball member 85, and the one of the locking teeth 93a and the ball member 85 are engaged with each other, thereby locking the side bracket 41 (the double seat 10) to the vehicle floor F.

According to the second embodiment, effects described below will be achieved in addition to the first, second, fourth and fifth effects according to the first embodiment. First, the supporting lever 93, which is engaged with the guide member 83 when the collision of the vehicle occurs, is supported by the vehicle floor F at the pivot center defined adjacently to the vehicle floor F, regardless of the longitudinal position of the double seat 10. Accordingly, the seatbelt load generated when the collision of the vehicle occurs is effectively received by the vehicle floor F.

Second, according to the second embodiment, when the normal seatbelt load is applied to the double seat 10, the ball member 85 is prevented from being engaged with one of the locking teeth 93a by being interrupted by the hollow member 84. Accordingly, the longitudinal position of the double seat 10 is smoothly adjusted. Further, a load for deforming (crushing) the hollow member 84 of the guide member 83 is appropriately determined. Accordingly, a load generated against the seatbelt load for locking the side bracket 41 (the double seat 10) and the vehicle floor F is effectively controlled.

Additionally, the above described embodiments may be modified as described hereinbelow. First, according to the first embodiment, the upper hook 73 may be formed at the side bracket 41 so as to be integral therewith.

Further according to the first embodiment, the lower hook 74 may be fixedly connected to the vehicle floor F in the vicinity of the third lower rail 64a. According to the second embodiment, the supporting lever 93 may be pivotably connected to the vehicle floor F in the vicinity of the rear end portion of the third lower rail 64a. In such conditions, the vehicle floor F around the single seat 30 serves as a supporting member for supporting the single seat 30 (the first seat).

Further according to the second embodiment, a locking tooth or plural locking teeth may be provided in place of the ball member 85 so as to be engageable with the locking teeth 93a of the supporting lever 93. Alternatively, a locking hole or plural locking holes, into which the locking teeth 93a is inserted, may be provided at the guide member 83, According to the first and second embodiments, the side bracket 41 and the side frame 42 may be formed to be symmetrical to each other. Further, the three-point supporting seatbelts 13, 14 and 33 may be structured in a manner where each of the shoulder belts 15, 20, 35 and each of the lap belts 17, 22, 37 are connected by a metallic connecting member as an example.

Technical idea of the above described embodiments will be additionally described hereinbelow.

According to the embodiments, the seat apparatus for the vehicle includes the single seat 30 (the first seat), the double seat 10 (the second seat), and the three-point supporting seatbelt 14 (the seatbelt mechanism). The single seat is adapted to be mounted on the vehicle floor F and includes the seating position SI (the first seating position). The double seat 10 is also adapted to be mounted on the vehicle floor F via the first and second seat slide mechanisms 46a and 46b extending in the longitudinal direction of the vehicle so as to adjoin the single seat 30 in the width direction of the vehicle. The double seat 10 includes the seating position Sr (the second seating position) and the seating position Sc (the third seating position) between the seating positions Sr and Sc. The three-point supporting seatbelt 14 is provided at the seating position Sc of the double seat 10, The three-point supporting seatbelt 14 includes the shoulder belt guide member 21 for guiding the shoulder belt 20, the belt buckle plate 23 (the belt anchor) to which the first end portion of the lap belt 22 is fixedly connected, and the belt buckle plate 24 (the belt attachment portion) which is provided at the first side portion of the double seat 10 and to which the first end portion of the shoulder belt 20 and the second end portion of the lap belt 22 are configured to be fixedly connected. The center frame 43 (the first frame member) for supporting the double seat 10 and the first seat slide mechanism 46a are arranged to be vertically coplanar with the shoulder belt guide member 21 and the belt buckle plate 23. The second seat slide mechanism 46b is disposed at the second side portion of the double seat 10. The side bracket 41 (the second frame member) for supporting the double seat 10 is disposed at the first side portion of the double seat 10. The first lock member (the upper hook 73, the guide member 83) is provided at the side bracket 41 of the double seat 10. The second lock member (the lower hook 74, the supporting lever 93) is provided at the supporting member (the third seat slide mechanism 66a, the vehicle floor F around the third seat slide mechanism 66a). The first and second lock members allow a movement of the side bracket 41 (the double seat 10) relative to the vehicle floor F when the excess load is received from the three-point supporting seatbelt 14.

Due to the above described structure, although the double seat 10 includes the lock mechanism (the upper hook 73 and the lower hook 74 or the guide member 83 including the locking ball 85 and the supporting lever 93) between the side bracket 41 and the supporting member for supporting the single seat 30 (the third seat slide mechanism 66a or the vehicle floor F), the lock mechanism includes a simple structure which does not interact with the side bracket 41. Further, a part of the space for disposing the supporting member (the third seat slide mechanism 66a or the vehicle floor F around the single seat 30) is employed for disposing the lock mechanism. Therefore, a space required for disposing the lock mechanism may be reduced. Further, the double seat 10 includes two seat slide mechanisms (first and second seat slide mechanisms 46a and 46b). Therefore, an increase of the weight of the seat apparatus is suppressed, and a structure of the seat apparatus is simplified, Further, the seatbelt load generated when the collision of the vehicle occurs is received by the first and second lock members (the upper hook 73 and the lower hook 74 or the guide member 83 and the supporting lever 93) in addition to the first and second seat slide mechanisms 46a and 46b. Accordingly, a satisfactory strength (re-sistibility) of the seat apparatus is assured.

The first lock member includes the upper hook 73 (the first hook), which extends in the forward and backward direction of the vehicle and includes a U-shaped cross section opening towards the upper side thereof. Further, the second lock member includes the lower hook 74 (the second hook), which extends in the forward and backward direction of the vehicle at a position further upwardly than the upper hook 73 and includes a U-shaped cross section opening towards the lower side thereof. The side bracket 41 is locked relative to the vehicle floor F by the engagement between the upper and lower hooks 73 and 74 when the excess load is received through the three-point supporting seatbelt 14.

Due to the above described structure, the position of the upper and lower hooks 73 and 74, each of which extends in the forward and backward direction of the vehicle, may be determined in accordance with the longitudinal range of the side bracket 41 or the longitudinal range of the supporting member provided adjacently to the side bracket 41 of the double seat 10. Accordingly, the upper and lower hooks 73 and 74 are restrained from exposing to the external portion of the seat apparatus, thereby improving the external appearance of the seat apparatus.

Further, the first lock member includes the guide member 83 which extends from the belt buckle plate 24 provided at the side bracket 41 of the double seat 10 and includes the ball member 85 (the locking portion). The second lock member includes the supporting lever 93 (the lever member) which includes the plural locking teeth 93a (the plural locking protrusions) equidistantly aligned in the forward and backward direction of the vehicle so as to be engageable with the ball member 85 of the guide member 83. The side bracket 41 is locked relative to the vehicle floor F by the engagement between the one of the locking teeth 93a of the supporting lever 93 and the ball member 85 of the guide member 83 when the excess load is received through the three-point supporting seatbelt.

Due to the above described structure, the supporting lever 93, which is engaged with the guide member 83 when the collision of the vehicle occurs, for example, is supported by the vehicle floor F at the pivot center 92 defined adjacently to the vehicle floor F, regardless of the longitudinal position of double seat 10. Accordingly, the seatbelt load generated when the collision of the vehicle occurs is effectively received by the vehicle floor F.

Still further, the guide member 83 includes the hollow member 84 (the hollow portion) through which the supporting lever 93 is inserted. The ball member 85 of the guide member 83 is provided at the lower side of the hollow member 84. The locking teeth 93a are formed at the lower side portion of the supporting lever 93. When the excess load is received through the three-point supporting seatbelt 14, the hollow member 84 is deformed between the one of the locking teeth 93a and the ball member 85, and the one of the locking teeth 93a and the ball member 85 are engaged with each other for locking the side bracket 41 relative to the vehicle floor F.

Due to the above described structure, when the normal seatbelt load is applied to the second seat, the ball member 85 is prevented from being engaged with one of the locking teeth 93a by being interrupted by the hollow member 84. Accordingly, the longitudinal position of the double seat 10 is smoothly adjusted. Further, the load for deforming (crushing) the hollow member 84 of the guide member 83 is appropriately determined. Accordingly, a load generated against the load for locking the side bracket 41 (the double seat 10) and the vehicle floor F is effectively controlled.

Further according to the embodiments, the supporting member includes the third seat slide mechanism 66a for supporting the single seat 30. The number of input portions of the load applied to the first seat slide mechanism 46a is determined to be equal to the number of input portions of the load applied to the third seat slide mechanism 66a when the excess load is received through the three-point supporting seatbelt 14.

Further, the first seat slide mechanism 46a and the third seat slide mechanism 66a are disposed symmetrically relative to the enter line L of the vehicle floor F in the width direction of the vehicle.

Due to the above described structure, in the condition where the collision of the vehicle occurs when each of the seating positions Sr, Sc and Sl is occupied, for example, the seatbelt load applied to the vehicle floor F at the position corresponding to center frame 43 (the load applied to the first seat slide mechanism 46a) is inputted from an end of the shoulder belt guide member 21 of the three-point supporting seatbelt 14 provided at the intermediate seating position Sc, an end of the lap belt 22 of the three-point seatbelt 14, an end of the shoulder belt 15 of the three-point supporting seatbelt 13 provided at the right seating position Sr and an end of the lap belt 17 of the three-point supporting seatbelt 13. Further, in the same condition, the seatbelt load applied to the vehicle floor F at the position corresponding to the side frame 61 (the load applied to the third seat slide mechanism 66a) is inputted from an end of the shoulder belt 20 of the three-point supporting seatbelt 14, an end of the lap belt 22 of the three-point supporting seatbelt 14, an end of the shoulder belt 35 of the three-point supporting seatbelt 33 and an end of the lap belt 37 of the three-point supporting seatbelt 33. Thus, the number of input portions of the seatbelt load applied to the first seat slide mechanism 46a is determined to be equal to the number of input portions of the seatbelt load applied to the third seat slide mechanism 66a, Accordingly, the magnitude of the seatbelt load transmitted to the vehicle floor F at the position corresponding to the center frame 43 and the magnitude of the seatbelt load transmitted to the vehicle floor F at the position corresponding to the side frame 61 are arranged to be approximately the same.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
   a first seat adapted to be mounted on a vehicle floor and having a first seating position;
   a second seat adapted to be mounted on the vehicle floor via a first seat slide mechanism and a second seat slide mechanism extending in a forward and backward direction of the vehicle, the second seat adjoining the first seat in a width direction of the vehicle, the second seat having a second seating position and a third seating position located between the first seating position and the second seating position; and
   a seatbelt mechanism provided at the third seating position of the second seat and including a shoulder belt guide member for guiding a shoulder belt, a belt anchor to which a first end portion of a lap belt is fixedly connected, and a belt attachment portion which is provided at a first side portion of the second seat being adjacent to the first seat and to which a first end portion of the shoulder belt and a second end portion of the lap belt are configured to be fixedly connected, wherein
   a first frame member for supporting the second seat and the first seat slide mechanism are arranged to be vertically coplanar with the shoulder belt guide member and the belt anchor,
   the second seat slide mechanism is disposed at a second side portion of the second seat being opposite from the first seat,
   a second frame member for supporting the second seat is disposed at the first side portion of the second seat,
   a first lock member is provided at the second frame member of the second seat,
   a second lock member is provided at a supporting member for supporting the first seat, and
   the first and second lock members allow a movement of the second frame member in the forward and backward direction of the vehicle and engage with each other for locking the second frame member relative to the vehicle floor when an excess load is received from the seatbelt mechanism.

2. A seat apparatus for a vehicle according to claim 1, wherein
   the first lock member includes a first hook extending in the forward and backward direction of the vehicle and having a U-shaped cross section opening towards an upper side thereof,
   the second lock member includes a second hook extending in the forward and backward direction of the vehicle at a position further upwardly than the first hook and having a U-shaped cross section opening towards a lower side thereof, and
   the second frame member is locked relative to the vehicle floor by an engagement between the first and second hooks when the excess load is received through the seatbelt mechanism.

3. A seat apparatus for a vehicle according to claim 2, wherein
   the supporting member includes a third seat slide mechanism for supporting the first seat, and
   the number of input portions of a load applied to the first seat slide mechanism is determined to be equal to the number of input portions of a load applied to the third seat slide mechanism when the excess load is received through the seatbelt mechanism.

4. A seat apparatus for a vehicle according to claim 3, wherein
   the first seat slide mechanism and the third seat slide mechanism are disposed symmetrically relative to a center line of the vehicle floor in the width direction of the vehicle.

5. A seat apparatus for a vehicle according to claim 1, wherein
   the first lock member includes a guide member extending from the belt attachment portion provided at the second frame member and having a locking portion, and
   the second lock member includes a lever member pivotably connected to the supporting member and extending in the forward and backward direction of the vehicle and inserted through the guide member, the lever member having a plurality of locking protrusions equidistantly aligned in the forward and backward direction of the vehicle so as to be engageable with the locking portion of the first hook, and
   the second frame member is locked relative to the vehicle floor by an engagement between one of the locking protrusions of the lever member and the locking portion of the guide member when the excess load is received through the seatbelt mechanism.

6. A seat apparatus for a vehicle according to claim 5, wherein
   the guide member includes a hollow portion through which the lever member is inserted,
   the locking portion of the guide member is provided at a lower side of the hollow portion,
   the plurality of locking protrusions are formed at a lower side portion of the lever member, and
   the hollow portion is deformed between one of the locking protrusions and the locking portion and the one of the locking protrusions and the locking portion are engaged with each other for locking the second frame member relative to the vehicle floor when the excess load is received through the seatbelt mechanism.

7. A seat apparatus for a vehicle according to claim 6, wherein
   the supporting member includes a third seat slide mechanism for supporting the first seat, and
   the number of input portions of a load applied to the first seat slide mechanism is determined to be equal to the number of input portions of a load applied to the third seat slide mechanism when the excess load is received through the seatbelt mechanism.

8. A seat apparatus for a vehicle according to claim 7, wherein
   the first seat slide mechanism and the third seat slide mechanism are disposed symmetrically relative to a center line of the vehicle floor in the width direction of the vehicle.

9. A seat apparatus for a vehicle according to claim 5, wherein
the supporting member includes a third seat slide mechanism for supporting the first seat, and
the number of input portions of a load applied to the first seat slide mechanism is determined to be equal to the number of input portions of a load applied to the third seat slide mechanism when the excess load is received through the seatbelt mechanism.

10. A seat apparatus for a vehicle according to claim 9, wherein
the first seat slide mechanism and the third seat slide mechanism are disposed symmetrically relative to a center line of the vehicle floor in the width direction of the vehicle.

11. A seat apparatus for a vehicle according to claim 1, wherein
the supporting member includes a third seat slide mechanism for supporting the first seat, and
the number of input portions of a load applied to the first seat slide mechanism is determined to be equal to the number of input portions of a load applied to the third seat slide mechanism when the excess load is received through the seatbelt mechanism.

12. A seat apparatus for a vehicle according to claim 11, wherein
the first seat slide mechanism and the third seat slide mechanism are disposed symmetrically relative to a center line of the vehicle floor in the width direction of the vehicle.

* * * * *